(12) United States Patent
Wake et al.

(10) Patent No.: US 12,066,839 B2
(45) Date of Patent: Aug. 20, 2024

(54) AGRICULTURAL DRONE HAVING IMPROVED SAFETY

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 876 days.

(21) Appl. No.: 16/962,869

(22) PCT Filed: Feb. 28, 2019

(86) PCT No.: PCT/JP2019/007731
§ 371 (c)(1),
(2) Date: Jul. 17, 2020

(87) PCT Pub. No.: WO2019/168079
PCT Pub. Date: Sep. 6, 2019

(65) Prior Publication Data
US 2020/0348698 A1 Nov. 5, 2020

(30) Foreign Application Priority Data

Feb. 28, 2018 (JP) ................................. 2018-035037

(51) Int. Cl.
*G05D 1/00* (2024.01)
*A01M 7/00* (2006.01)
(Continued)

(52) U.S. Cl.
CPC .......... *G05D 1/106* (2019.05); *A01M 7/0089* (2013.01); *B64C 27/006* (2013.01);
(Continued)

(58) Field of Classification Search
CPC ... G05D 1/106; G05D 1/0055; A01M 7/0089; B64C 27/006; B64C 39/024;
(Continued)

(56) References Cited

U.S. PATENT DOCUMENTS

| 9,448,562 B1* | 9/2016 | Sirang ................... B64C 39/024 |
| 2015/0225081 A1* | 8/2015 | Stabler ................ G05D 1/0088 |
| | | 701/3 |

(Continued)

FOREIGN PATENT DOCUMENTS

| JP | 2001039397 A * | 2/2001 |
| JP | 2001-120151 A | 5/2001 |

(Continued)

OTHER PUBLICATIONS

International Search Report of PCT/JP2019/007731 dated Jun. 4, 2019.

*Primary Examiner* — Donald J Wallace
*Assistant Examiner* — Jalal C Coduroglu
(74) *Attorney, Agent, or Firm* — MATTINGLY & MALUR, PC

(57) ABSTRACT

Provide is an agricultural chemical spraying drone with improved safety. An acceleration sensor and a contact detection sensor are combined to detect contact of a drone with an obstacle. In a case where the contact is detected, a retreat action such as hovering is taken. In addition, a message may be displayed on a control terminal, a warning sound may be generated, and a warning light may be turned on. Further, a structure capable of minimizing finger insertion accidents and minimizing interference with a rotor even in collision is adopted as a propeller guard.

12 Claims, 9 Drawing Sheets

(51) Int. Cl.
  *B64C 27/00* (2006.01)
  *B64C 39/02* (2023.01)
  *B64D 1/18* (2006.01)
  *B64D 27/24* (2024.01)
  *B64D 45/00* (2006.01)
  *B64U 10/13* (2023.01)
  *B64U 30/20* (2023.01)
  *B64U 50/19* (2023.01)
  *B64U 101/00* (2023.01)

(52) U.S. Cl.
  CPC .............. *B64C 39/024* (2013.01); *B64D 1/18* (2013.01); *B64D 27/24* (2013.01); *B64D 45/00* (2013.01); *B64U 10/13* (2023.01); *B64U 30/20* (2023.01); *B64U 50/19* (2023.01); *B64U 2101/00* (2023.01); *B64U 2201/20* (2023.01)

(58) Field of Classification Search
  CPC .......... B64C 13/18; B64D 1/18; B64D 27/24; B64D 45/00; B64U 10/13; B64U 30/20; B64U 50/19; B64U 2101/00; B64U 2201/20; Y02T 50/60
  See application file for complete search history.

(56) References Cited

U.S. PATENT DOCUMENTS

| | | | |
|---|---|---|---|
| 2016/0200421 A1* | 7/2016 | Morrison | B64C 13/18 244/17.23 |
| 2017/0152843 A1* | 6/2017 | Bei | B05B 12/08 |
| 2017/0313433 A1 | 11/2017 | Ozaki | |
| 2018/0214324 A1* | 8/2018 | Groden | B64F 5/60 |
| 2018/0257775 A1 | 9/2018 | Baek et al. | |
| 2019/0009893 A1 | 1/2019 | Toyama et al. | |
| 2019/0362640 A1* | 11/2019 | Wu | B64D 1/18 |
| 2020/0327747 A1* | 10/2020 | Yamada | B64F 5/60 |

FOREIGN PATENT DOCUMENTS

| | | | | |
|---|---|---|---|---|
| JP | 2004-166968 A | 6/2004 | | |
| JP | 2005-178558 A | 7/2005 | | |
| JP | 2009-010197 A | 1/2009 | | |
| JP | 2009-112723 A | 5/2009 | | |
| JP | 2015-85755 A | 5/2015 | | |
| JP | 2016-88111 A | 5/2016 | | |
| JP | 2017-163265 A | 9/2017 | | |
| WO | 2016/166366 A1 | 10/2016 | | |
| WO | WO-2017000304 A1 * | 1/2017 | | B60F 5/02 |
| WO | 2017/086234 A1 | 5/2017 | | |
| WO | 2017/154421 A1 | 9/2017 | | |

\* cited by examiner

AGRICULTURAL DRONE HAVING IMPROVED SAFETY

CROSS-REFERENCE TO RELATED APPLICATIONS

The present application is a national phase of an international application, PCT/JP2019/007731, filed on Feb. 28, 2019, which claims the benefit of Japanese Application No. 2018-035037, filed on Feb. 28, 2018, the disclosure of which is hereby incorporated by reference herein in its entirety.

TECHNICAL FIELD

The present invention relates to a flight vehicle (drone), in particular, a drone with improved safety, and a control method and a control program therefor.

BACKGROUND ART

The application of small helicopters (multicopters) generally called drones is in progress. One of the important fields of application thereof is the spraying of chemicals such as pesticides or liquid fertilizers to farmland (farm field) (for example, Patent Literature 1). In Japan where farmland is smaller than in the Europe and the U.S., drones are more suitable than manned airplanes and helicopters in many cases.

Technologies such as a Quasi-Zenith Satellite System and a Real Time Kinematic-Global Positioning System (RTK-GPS) allow a drone to accurately know the absolute position of the own plane in centimeters during flight. Thus, even in the typical small and complex farmland in Japan, it is possible to fly a drone autonomously with minimum manual control and to spray chemicals efficiently and accurately.

On the other hand, in some cases, safety considerations were not sufficient for autonomous drones intended for spraying agricultural chemicals. Since a drone loaded with chemicals weighs several tens of kilograms, the case of an accident such as falling onto a person may have serious consequences. Further, the operator of a drone is usually not an expert, so therefore a foolproof mechanism is required, but the consideration for this was insufficient. Until now, there have been drone safety technologies based on human control (for example, Patent Literature 2), but there was no technology for addressing safety issues specific to autonomous drones for spraying agricultural chemicals.

CITATION LIST

Patent Literature

Patent Literature 1: JP 2001-120151 A
Patent Literature 2: JP 2017-163265 A

SUMMARY OF INVENTION

Technical Problem

Provided is a drone (flight vehicle) that can maintain high safety even during autonomous flight.

Solution to Problem

In the present invention, the above-described problem is solved by providing a drone. The drone includes an acceleration measurement unit, a contact detection unit, and a flight control unit. In a case where an absolute value of an acceleration of an airframe measured by the acceleration measurement unit exceeds a predetermined value, and the contact detection unit detects contact of the airframe with an obstacle for a first predetermined time or more, the flight control unit causes the airframe to take a predetermined retreat action.

In the present invention, the above-described problem is solved by providing a drone. The drone includes an acceleration measurement unit, a contact detection unit, and a flight control unit. In a case where an absolute value of an acceleration of the airframe measured by the acceleration measurement unit does not exceed a predetermined value, and the contact detection unit detects contact of the airframe with an obstacle for a second predetermined time or more, the flight control unit causes the airframe to take a predetermined retreat action. The contact detection unit may be a pressure sensor or a microswitch. Further, in the present invention, the above-described problem is solved by providing the drone described in paragraph 0007 or the first half of paragraph 0008. The drone further includes a speed measurement unit. In a case where the acceleration measurement unit detects a predetermined value or more of increase or change in the acceleration of the airframe within a predetermined time interval, and then the speed measurement unit detects that a speed of the airframe becomes a predetermined value or less, the airframe is considered to come into contact with the obstacle.

Further, in the present invention, the above-described problem is solved by providing the drone described in paragraph 0007 or paragraph 0008. In the drone, the predetermined retreat action is hovering. Further, in the present invention, the above-described problem is solved by providing the drone described in paragraph 0007, paragraph 0008, or the first half of paragraph 0009. In the drone, the predetermined retreat action includes any one or more of stoppage of chemical spraying, warning with a voice, and warning with a warning light.

Further, in the present invention, the above-described problem is solved by providing the drone described in paragraph 0009. In the drone, in a case where the contact detection unit detects contact of the airframe with the obstacle for a third predetermined time or more after the hovering, the flight control unit causes the airframe to fly backward in a traveling direction.

Further, in the present invention, the above-described problem is solved by providing a drone. The drone includes a plurality of rotor blades, a rotation speed measurement unit for the plurality of rotor blades, and a flight control unit. In a case where a rotation speed of at least one of the plurality of rotor blades measured by the rotation speed measurement unit is lower than a target rotation speed of a corresponding motor by a first predetermined rotation speed or more, the flight control unit takes a predetermined retreat action.

Further, in the present invention, the above-described problem is solved by providing the drone described in paragraph 0011. In the drone, the predetermined retreat action is to stop all rotations of the plurality of motors.

Further, in the present invention, the above-described problem is solved by providing the drone described in paragraph 0011. In the drone, the predetermined retreat action is to continue flight in a case where the target rotation speed is set to be lowered by a second predetermined rotation speed, and a rotation speed measured by the rotation speed measurement unit is maintainable to a new target rotation speed.

Further, in the present invention, the above-described problem is solved by providing a drone. The drone includes a propeller guard configured by a first part, a second part, and a third part. The first part has a lattice structure with a roughness of preventing a finger from entering, the second part has a lattice structure with a roughness of preventing a head of an infant from entering, and the third part does not have a lattice structure.

Further, in the present invention, the above-described problem is solved by providing a drone. The drone includes a propeller guard configured by a plurality of radial members and a peripheral part. At least one of the plurality of radial members has a notch portion on a propeller side.

Further, in the present invention, the above-described problem is solved by providing a drone. The drone includes a propeller guard configured by a plurality of radial members and a peripheral part. Radial members above the rotor blade among the plurality of radial members are positioned such that an end connected to the peripheral part is lower than an end connected to an airframe body, and radial members below the rotor blade among the plurality of radial members are positioned such that an end connected to the peripheral part is higher than an end connected to the airframe body.

Further, in the present invention, the above-described problem is solved by providing a drone control method. The drone control method includes: an acceleration measurement step of measuring an acceleration of an airframe; a contact detection step of detecting contact of the airframe with an obstacle; and a retreat action step of causing the airframe to take a predetermined retreat action in a case where an absolute value of the measured acceleration of the airframe exceeds a predetermined value, and the contact of the airframe with the obstacle is detected for a first predetermined time or more. The contact detection step may be to detect the contact by using a pressure sensor or a microswitch. Further, in the present invention, the above-described problem is solved by providing the drone control method described in paragraph 0015. The drone control method further includes: a speed measurement step. In a case where a predetermined value or more of increase or change in the acceleration of the airframe within a predetermined time interval is detected in the acceleration measurement step, and then it is detected in the speed measurement step that a speed of the airframe becomes a predetermined value or less, the airframe is considered to come into contact with the obstacle.

Further, in the present invention, the above-described problem is solved by providing a drone control method. The drone control method includes: an acceleration measurement step of measuring an acceleration of an airframe; a contact detection step of detecting contact of the airframe with an obstacle; and a retreat action step of causing the airframe to take a predetermined retreat action in a case where the contact of the airframe with the obstacle is detected for a second predetermined time or more although an absolute value of the measured acceleration of the airframe does not exceed a predetermined value.

Further, in the present invention, the above-described problem is solved by providing the drone control method described in paragraph 0016 or paragraph 0017. In the drone control method, the predetermined retreat action in the retreat action step is hovering. Further, in the present invention, the above-described problem is solved by providing the drone described in paragraph 0016, paragraph 0017, or the first half of paragraph 0018. In the drone, the predetermined retreat action in the retreat action step includes any one or more of stoppage of chemical spraying, warning with a voice, and warning with a warning light.

Further, in the present invention, the above-described problem is solved by providing the drone control method described in the first half of paragraph 0018. In the drone control method, in the retreat action step, the airframe is caused to fly backward in a traveling direction in a case where contact of the airframe with the obstacle for a third predetermined time or more is detected after the hovering.

Further, in the present invention, the above-described problem is solved by providing a drone control method. The drone control method includes: a rotation speed measurement step of measuring a rotation speed of a rotor blade; and a retreat action step of causing an airframe to take a predetermined retreat action in a case where the measured rotation speed is lower than a first predetermined rotation speed.

Further, in the present invention, the above-described problem is solved by providing the drone control method described in paragraph 0020. In the drone control method, the retreat action is to stop a rotation of a motor.

Further, in the present invention, the above-described problem is solved by providing the drone control method described in paragraph 0020. In the drone control method, in the retreat action step, flight is continued in a case where a motor is able to maintain a second predetermined rotation speed lower than the first predetermined rotation speed.

Further, in the present invention, the above-described problem is solved by providing a drone control program. The drone control program causes a computer to execute: an acceleration measurement command to measure an acceleration of an airframe; a contact detection command to detect contact of the airframe with an obstacle; and a retreat action command to cause the airframe to take a predetermined retreat action in a case where an absolute value of the measured acceleration of the airframe exceeds a predetermined value, and the contact of the airframe with the obstacle is detected for a first predetermined time or more.

Further, in the present invention, the above-described problem is solved by providing a drone control program. The drone control program causes a computer to execute: an acceleration measurement command to measure an acceleration of an airframe; a contact detection command to detect contact of the airframe with an obstacle; and a retreat action command to cause the airframe to take a predetermined retreat action in a case where the contact of the airframe with the obstacle is detected for a second predetermined time or more although an absolute value of the measured acceleration of the airframe does not exceed a predetermined value. In the contact detection command, the contact may be detected by using a pressure sensor or a microswitch. Further, in the present invention, the above-described problem is solved by providing the drone control program described in paragraph 0023 or the first half of paragraph 0024. The drone control program causes a computer to further execute: a speed measurement command. In a case where a predetermined value or more of increase or change in the acceleration of the airframe within a predetermined time interval is detected in the execution of the acceleration measurement command, and then it is detected in the execution of the speed measurement command that a speed of the airframe becomes a predetermined value or less, the airframe is considered to come into contact with the obstacle.

Further, in the present invention, the above-described problem is solved by providing the drone control program described in paragraph 0023 or paragraph 0024. In the drone control program, the predetermined retreat action is hovering. Further, in the present invention, the above-described problem is solved by providing the drone control program described in paragraph 0023, paragraph 0024, or the first half of paragraph 0025. In the drone control program, the predetermined retreat action includes any one or more of stoppage of chemical spraying, warning with a voice, and warning with a warning light.

Further, in the present invention, the above-described problem is solved by providing the drone control program described in paragraph 0024. In the drone control program, the retreat action step command further includes a command to cause the airframe to fly backward in a traveling direction in a case where contact of the airframe with the obstacle for a third predetermined time or more is detected after the hovering.

Further, in the present invention, the above-described problem is solved by providing a drone control program. The drone control program causes a computer to execute: a rotation speed measurement command to measure a rotation speed of a rotor blade; and a retreat action command to cause an airframe to take a predetermined retreat action in a case where the measured rotation speed is lower than a first predetermined rotation speed.

Further, in the present invention, the above-described problem is solved by providing the drone control program described in paragraph 0027. In the drone control program, the retreat action is to stop a rotation of the motor.

Further, in the present invention, the above-described problem is solved by providing the drone control program described in claim paragraph 0027. In the drone control program, the retreat action command includes a command to continue flight in a case where a motor is able to maintain a second predetermined rotation speed lower than the first predetermined rotation speed.

Incidentally, the computer program can be provided by being downloaded via a network such as the Internet, or can be provided by being recorded in various computer-readable recording media such as a CD-ROM.

ADVANTAGEOUS EFFECTS OF INVENTION

Provided is the drone (flight vehicle) that can maintain high safety even during autonomous flight.

DESCRIPTION OF EMBODIMENTS

Hereinafter, modes for carrying out the present invention will be described with reference to the drawings. The drawings are all examples.

Figure 1:
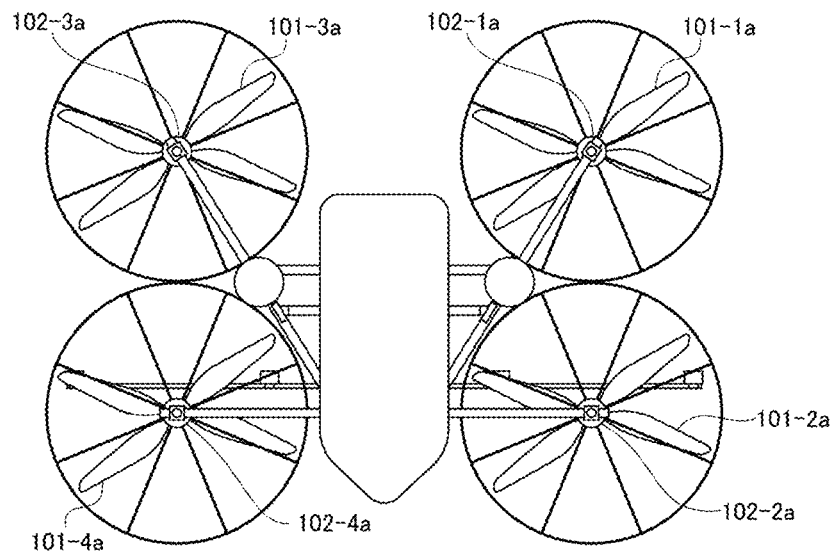
FIG. 1 is a plan view of an embodiment of an agricultural drone according to the present invention.
Figure 2:
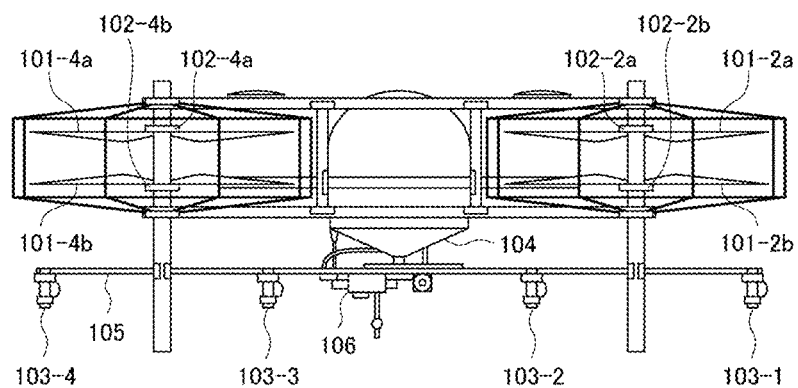
FIG. 2 is a front view of the embodiment of the agricultural drone according to the present invention.
Figure 3:
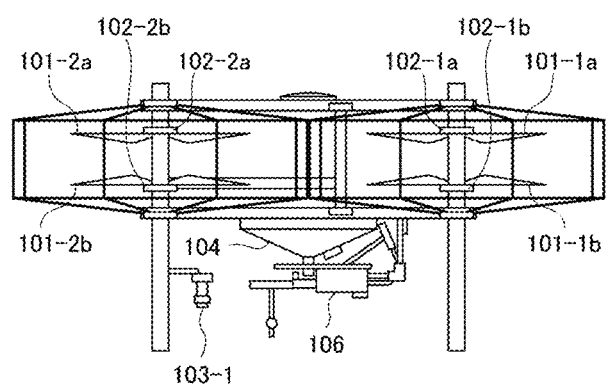
FIG. 3 is a right side view of the embodiment of the agricultural drone according to the present invention.

FIG. 1 is a plan view of an embodiment of a drone (100) according to the present invention, FIG. 2 is a front view (viewed from a traveling direction side), and FIG. 3 is a right side view thereof. Incidentally, in this description, a drone is defined as a general flight vehicle having multiple rotor blades or flight units, regardless of a power means (electric power, prime mover, or the like), an operating system (wireless or wired, autonomous or manual flight type, or the like).

Rotor blades (101-1a, 101-1b, 101-2a, 101-2b, 101-3a, 101-3b, 101-4a, and 101-4b) (also called rotors) are units for flying the drone (100). It is desirable that eight rotor blades (four sets of two-stage rotor blades) are provided in consideration of the balance of flight stability, airframe size, and battery consumption.

Motors (102-1a, 102-1b, 102-2a, 102-2b, 102-3a, 102-3b, 102-4a, and 102-4b) are units (which are typically an electric motor but may be a motor or the like) for rotating the rotor blades (101-1a, 101-1b, 101-2a, 101-2b, 101-3a, 101-3b, 101-4a, and 101-4b), and it is desirable that one motor be installed in one rotor blade. In the upper and lower rotor blades (for example, 101-1a and 101-1b) and the corresponding motors (for example, 102-1a and 102-1b) in one set, desirably, axes are collinear and rotate in directions opposite to each other for the flight stability of the drone. Incidentally, although a part of the rotor blades (101-3b) and a part of the motors (102-3b) are not illustrated, their positions are obvious, and are illustrated if there is a left side view. As illustrated in FIGS. 2 and 3, desirably, a radial member for supporting a propeller guard, which is provided such that a rotor blade (102) does not interfere with foreign matters, is not horizontal but a roof structure. The structure promotes the buckling of the member to the outside of the rotor blade (102) at the time of collision to prevent the member from interfering with the rotor blade (102).

Chemical nozzles (103-1, 103-2, 103-3, and 103-4) are units for spraying chemicals downward, and four chemical nozzles are preferably provided. Incidentally, in this description, the chemicals are generally referred to as liquids or powders sprayed on farm field such as pesticides, herbicides, liquid fertilizers, insecticides, seeds, and water.

A chemical tank (104) is a tank for storing chemicals to be sprayed, and is preferably provided at a position close to the center of gravity of the drone (100) and lower than the center of gravity from the viewpoint of weight balance. Chemical hoses (105-1, 105-2, 105-3, and 105-4) are units for connecting the chemical tank (104) with respective chemical nozzles (103-1, 103-2, 103-3, and 103-4). The chemical hoses are made of a hard material and may also serve to support the chemical nozzle. A pump (106) is a unit for discharging the chemicals from the nozzle.

Figure 4:
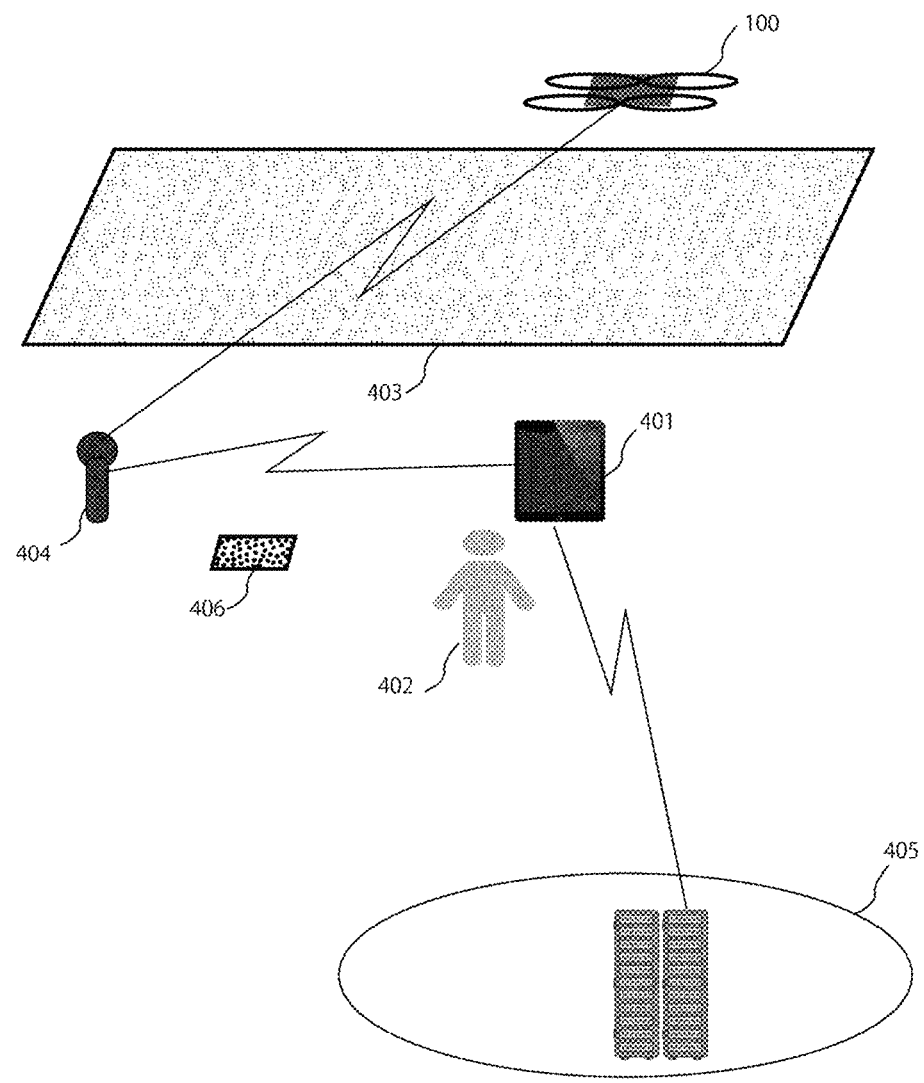
FIG. 4 is an example of an overall conceptual view of a chemical spraying system using the embodiment of the agricultural drone according to the present invention.

FIG. 4 illustrates an overall conceptual view of a system using an embodiment of a chemical spraying application of the drone (100) according to the present invention. This drawing is a schematic view, and the scale is not accurate. A remote controller (401) is a unit for transmitting a command to the drone (100) by the operation of a user (402) and displaying information (for example, a position, a chemical amount, a battery level, and a camera image) received from the drone (100). The remote controller may be realized by a portable information device such as a general tablet terminal for operating a computer program. It is desirable that the drone (100) according to the present invention be controlled to perform autonomous flight. However, a manual operation is desirably performed at the time of basic operation such as take-off and return and at the time of emergency. In addition to portable information devices, an emergency operation device (not illustrated) having an exclusive emergency stop function may be used (desirably, the emergency operation device is a dedicated device which is equipped with a large emergency stop button or the like so as to be able to respond quickly in case of emergency). It is desirable that the remote controller (401) and the drone (100) perform wireless communication by Wi-Fi or the like.

A farm field (403) is a rice field, an upland field, or the like targeted for chemical spraying by the drone (100). Actually, the topography of the farm field (403) is complicated, and there is a case where the topographic map cannot be obtained in advance, or the topographic map and the situation of the site are inconsistent. Usually, the farm field (403) is adjacent to a house, a hospital, a school, a farm field for other crops, a road, a railroad, and the like. Further, there may also be obstacles such as buildings and electric wires in the farm field (403).

A base station (404) is a device which provides a master unit function of Wi-Fi communication and the like. Desirably, the base station also functions as an RTK-GPS base station to provide the accurate position of the drone (100) (the master unit function of Wi-Fi communication and the RTK-GPS base station may be independent devices). A farm cloud (405) is typically a group of computers operated on a cloud service and related software, and it is desirable that the farm cloud (405) is wirelessly connected to the remote controller (401) via a mobile phone line or the like. The farm cloud (405) may analyze the image of the farm field (403) photographed by the drone (100), grasp the growth status of crops, and perform processing for determining a flight route. Further, the drone (100) may be provided with the stored topographical information or the like of the farm field (403). In addition, the history of the flight of the drone (100) and photographed images may be accumulated to perform various analysis processes.

Usually, the drone (100) takes off from a landing point (406) outside the farm field (403), and returns to the landing point (406) after spraying chemicals on the farm field (403), or when it becomes necessary to replenish the chemicals or charge. A flight route (entry route) from the landing point (406) to the target farm field (403) may be stored in advance in the farm cloud (405) or the like, or may be inputted by the user (402) before starting take-off.

Figure 5:
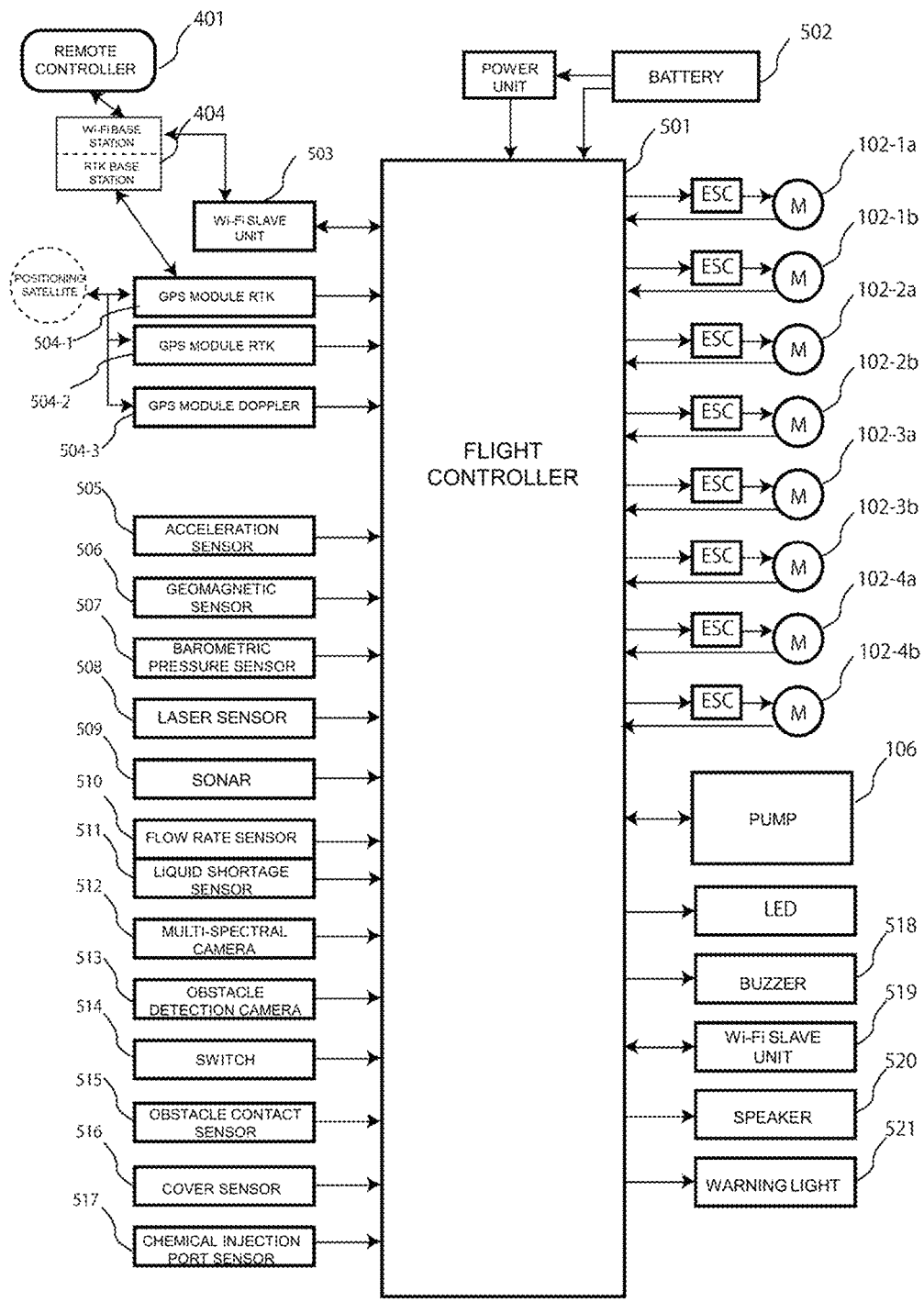
FIG. 5 is a schematic diagram illustrating a control function of the embodiment of the agricultural drone according to the present invention.

FIG. 5 is a schematic diagram illustrating a control function of the embodiment of the chemical spraying drone according to the present invention. A flight controller (501) is a component which controls the entire drone, and specifically may be an embedded computer including a CPU, memory, related software, and the like. The flight controller (501) controls the flight of the drone (100) by controlling the rotation speed of the motors (102-1a, 102-1b, 102-2a, 102-2b, 102-3a, 102-3b, 104-a, and 104-b) with control means such as electronic speed control (ESC) on the basis of the input information received from the remote controller (401) and the input information obtained from various sensors described later. It is desirable to have a configuration that the actual rotation speed of the motors (102-1a, 102-1b, 102-2a, 102-2b, 102-3a, 102-3b, 104-a, and 104-b) is fed back to the flight controller (501) to monitor whether or not a normal rotation is performed. Alternatively, the rotor blade (101) may be provided with an optical sensor or the like so that the rotation of the rotor blade (101) is fed back to the flight controller (501).

The software used by the flight controller (501) is preferably rewritable through a storage medium or the like for function expansion/change, problem correction, or the like, or through communication means such as Wi-Fi communication or USB. In this case, it is desirable that the protection by encryption, checksum, electronic signature, virus check software, and the like prevents rewriting performed by unauthorized software. In addition, a part of a calculation process used in the control by the flight controller (501) may be executed by another computer existing on the remote controller (401), the farm cloud (405), or another place. Since the flight controller (501) is highly important, some or all of the components thereof may be duplexed.

A battery (502) is a unit which supplies power to the flight controller (501) and other components of the drone, and is desirably rechargeable. The battery (502) is desirably connected to the flight controller (501) via a fuse or a power supply unit including a circuit breaker or the like. The battery (502) is desirably a smart battery which has a function of transmitting the internal state (such as the amount of stored electricity and accumulated usage time) of the battery to the flight controller (501) in addition to a power supply function.

Desirably, the flight controller (501) interacts with the remote controller (401) via a Wi-Fi slave unit function (503) and further via the base station (404) so as to receive a necessary command from the remote controller (401) and transmit necessary information to the remote controller (401). In this case, it is desirable to encrypt the communication so as to prevent illegal acts such as interception, spoofing, and hijacking of equipment. The base station (404) desirably has an RTK-GPS base station function in addition to a Wi-Fi communication function. By combining a signal from the RTK base station and a signal from a GPS positioning satellite, a GPS module (504) can measure the absolute position of the drone (100) with an accuracy of about several centimeters. Since the GPS module (504) is highly important, it is desirable to duplex and multiplex the GPS module (504). Further, in order to cope with the failure of a specific GPS satellite, each of redundant GPS modules (504) is desirably controlled to use another satellite.

An acceleration sensor (505) is a unit which measures the acceleration of a drone body (further, a unit which calculates a speed by integrating the acceleration), and is desirably a six-axis sensor. A six-axis gyro sensor, a three-axis angle sensor, or both may be used instead of or in addition to the acceleration sensor (505). A geomagnetic sensor (506) is a unit which measures the direction of the drone body by measuring geomagnetism. A barometric pressure sensor (507) is a unit which measures atmospheric pressure, and can indirectly measure the altitude of the drone. A laser sensor (508) is a unit which measures a distance between the drone body and the ground surface by utilizing the reflection of laser light, and desirably uses an IR (infrared) laser. A sonar (509) is a unit which measures the distance between the drone body and the ground surface by utilizing the reflection of sound waves such as ultrasonic waves. These sensors may be selected according to the cost target and performance requirements of the drone. Further, a gyro sensor (angular velocity sensor) for measuring the tilt of the airframe, a wind force sensor for measuring wind force, and the like may be added. Further, it is desirable that these sensors be duplexed or multiplexed. In a case where there are multiple sensors for the same purpose, the flight controller (501) may use only one of the sensors, and when the sensor fails, the sensor may be switched to use an alternative sensor. Alternatively, a plurality of sensors may be used at the same time, and a case where respective measurement results do not match may be considered that a failure occurs.

A flow rate sensor (510) is a unit for measuring the flow rate of the chemicals, and the flow rate sensors are desirably provided at a plurality of places on the path from the chemical tank (104) to the chemical nozzle (103). A liquid shortage sensor (511) is a sensor which detects that the amount of the chemicals is equal to or less than a predetermined amount. A multi-spectral camera (512) is a unit which photographs the farm field (403) and obtains data for image analysis. An obstacle detection camera (513) is a camera for detecting drone obstacles. The obstacle detection camera has different image characteristics and lens direction from those of the multi-spectral camera (512), so that it is desirable that the obstacle detection camera is different from the multi-spectral camera (512). A switch (514) is a unit for the user (402) of the drone (100) to make various settings. An obstacle contact sensor (515) is a sensor for detecting that the drone (100), particularly, a rotor or a propeller guard part thereof is in contact with an obstacle such as an electric wire, a building, a human body, a standing tree, a bird, or other drone. A cover sensor (516) is a sensor which detects that an operation panel of the drone (100) and a cover for internal maintenance are open. A chemical injection port sensor (517) is a sensor which detects that the injection port of the chemical tank (104) is open. These sensors may be selected according to the cost target and performance requirements of the drone and may be duplexed or multiplexed. Further, a sensor may be provided at the base station (404) outside the drone (100), the remote controller (401), or other places, and the read information may be transmitted to the drone. For example, a wind force sensor may be provided in the base station (404), and information regarding wind force and a wind direction may be transmitted to the drone (100) via Wi-Fi communication.

The flight controller (501) transmits a control signal to the pump (106) to adjust the discharging amount of the chemicals and stop the chemical discharging. It is desirable that the current status (for example, the rotation speed) of the pump (106) is fed back to the flight controller (501).

An LED is a display unit for notifying a drone operator of the state of the drone. Instead of or in addition to the LED, a display unit such as a liquid crystal display may be used. A buzzer (518) is an output unit for notifying a drone state (particularly an error state) by an audio signal. A Wi-Fi slave unit function (519) is an optional component for communicating with an external computer or the like for the transfer of software, for example, separately from the remote controller (401). Instead of or in addition to the Wi-Fi slave unit function, another wireless communication means such as infrared communication, Bluetooth (registered trademark), ZigBee (registered trademark), and NFC or wired communication means such as USB connection may be used. A speaker (520) is an output unit for notifying the drone state (particularly an error state) by the recorded human voice, synthesized voice, or the like. Depending on the weather conditions, it may be difficult to see the visual display of the drone (100) in flight, and in such a case, it is effective to communicate the situation by voice. A warning light (521) is a display unit such as a strobe light for notifying the drone state (particularly an error state). These input/output units may be selected according to the cost target and performance requirements of the drone and may be duplexed or multiplexed.

Contact Detection Sensor

The drone according to the present invention desirably includes the obstacle contact sensor (515) (hereinafter, also referred to as "contact detection sensor"). The contact detection sensor (515) is a sensor for detecting "contact" of the drone with a standing tree, an electric wire, a building, or the like and has a different purpose from that of a sensor for detecting "collision" with a bird and "collision" between drones. In the case of collision, it is inevitable to respond to an emergency stop of the motor and the like. However, in the case of contact, as described below, a retreat action can be performed by hovering or reversing a traveling direction.

The contact detection sensor (515) is desirably installed in the propeller guard part which will be positioned on the outer peripheral part of the drone (100). The contact detection sensor (515) may be realized using a microswitch or a pressure detection element such as a piezo element. The contact detection sensor (515) may be provided in each of the upper and lower propeller guard parts of a double reversing rotor. A plurality of contact detection sensors (515) for respective directions may be provided around the propeller guard. However, by providing the contact detection sensor (515) at a portion where the propeller guard is connected to an airframe body, one sensor may detect contact in a plurality of directions. The contact detection sensor (514) in each direction is preferably duplexed or multiplexed. In this case, duplexing/multiplexing may be performed by different methods such as a microswitch and a piezo element.

The contact may be detected by the acceleration sensor (505) provided in the drone. In this case, it is desirable to distinguish a collision in which a retreat is impossible from a contact in which a retreat is possible by the magnitude of the absolute value of acceleration. For example, a case where an acceleration with an absolute value of 30G or more occurs may be determined as a collision, and a case where an acceleration with an absolute value of 9G to 30G occurs may be determined as the contact of the drone with a standing tree, an electric wire, a building, or the like.

On condition that a contact is detected by the acceleration sensor (505), and a contact during a predetermined time (for example, three seconds) or more is detected by the contact detection sensor (515), it may be determined that the drone (100) contacts an obstacle, and a retreat action may be taken. In such a manner, for example, it is possible to prevent a temporary strong wind from being erroneously detected as a contact with an obstacle. On condition that a contact during a long predetermined time (for example, ten seconds) or more is detected by the contact detection sensor (515) although a contact is not detected by the acceleration sensor (505), it may be determined that the drone (100) contacts an obstacle, and a retreat action may be taken. This is intended to detect a contact appropriately even in a case where accurate contact detection may be difficult with only with the acceleration sensor (505) when the drone (100) slowly contacts an elastic obstacle such as an electric wire.

Alternatively, a case where a peak of acceleration or a fluctuation above a predetermined value during an extremely short period of time (for example, 500 ms) occurs, and then the speed of the drone (100) becomes almost zero may be determined by the acceleration sensor (505) that the drone comes into contact with an electric wire or the like. Incidentally, the flight speed of the drone (100) can be measured based on the change of the position coordinates obtained by the GPS.

Retreat Action During Contact

When a contact is detected, the flight controller (501) desirably controls the motor (102) to cause the drone to hover (stop in the sky). In addition, it is desirable to display an error message on the remote controller (401). In a case where the drone (100) is in progress of spraying chemicals, it is desirable to stop the chemical spraying. This is because there is a risk of excessive spraying when the chemical spraying continues in the hovering state. Further, it is desirable to ask the user who performs a remote control about the action (emergency stop of the motor, return to the depot, switch to a manual control, and the like) to be taken next by using the display on the remote controller (401). In addition, a warning sound may be generated from the drone body by the buzzer (518) or the like in order to warn a person below of danger at the time of emergency landing. Similarly, the warning light (521) provided in the drone may be turned on or blinked.

Figure 6:
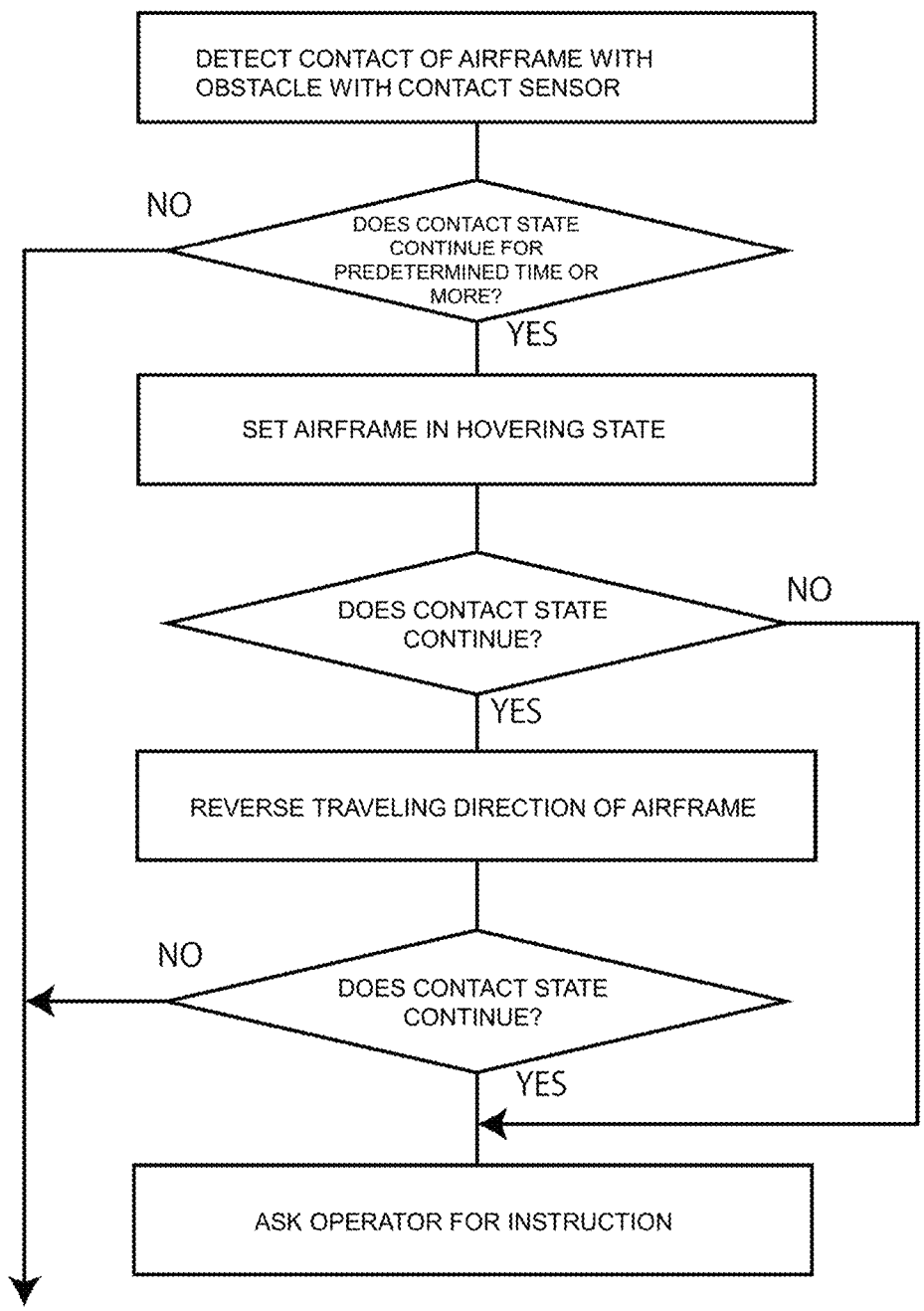
FIG. 6 is a flowchart illustrating a process at the time of contact detection in the embodiment of the drone according to the present invention.

In a case where the contact detection of the contact detection sensor continues even after entering the hovering state (for example, a case where the drone is caught by an elastic wire), it is desirable that the flight controller (501) flies the airframe of the drone to move backwards (in the direction opposite to the direction traveling up to now). In this case, in a case where the drone cannot move (for example, a case where the position of the airframe measured by the GPS (504) does not change) or a case where the contact state of the contact detection sensor still continues, it is desirable to display an error message on the remote controller (401) again and ask the operator for instructions on the action (emergency stop of the motor, return to the depot, switch to a manual control, and the like) to be taken next. An example of the above-described process at the time of contact detection is summarized in the flowchart of FIG. 6.

Detection of Foreign Matter Entanglement

Desirably, it is possible to measure the rotation speed of the motor (102) included in the drone according to the present invention and to input the rotation speed to the flight controller (501). In a case where it is detected that the rotation speed of at least one motor (102) is lower than the normal target rotation speed (for example, 5,000 rpm) with respect to the input voltage by a predetermined rotation speed (for example, 1,000 rpm) or more, it is desirable that the flight controller (501) determines that a foreign matter such as newspaper, a rope, a plant, and a plastic bag is entangled in the rotor blade, and causes the drone to take a predetermined retreat action. Instead of measuring the rotation speed of the motor (102), the rotation speed of the rotor blade (101) may be directly measured by an optical sensor or the like.

Here, the determination process of the foreign matter entanglement may be performed in two stages. That is, in a case where it is detected that the actual rotation speed of the motor is lower than a normal target rotation speed (for example, 5,000 rpm) by a predetermined rotation speed (for example, 1,000 rpm) or more, the target rotation speed may be lowered, and it may be reconfirmed again whether the rotation speed of the motor can maintain a new target rotation speed (for example, 3,000 rpm). Depending on the characteristics of the entangled foreign matter, the motor may be able to fly while maintaining a low rotation speed (for example, 3,000 rpm). For example, a case where a plastic bag is entangled is applied to this. In this case, it is preferable to cause the drone (100) to perform a degeneration operation and quickly return to the landing point (406). In this case, as in the above-described case of contact with an obstacle, it is desirable to display a message on the remote controller (401), generate a warning sound from the buzzer (518), and turn on or blink the warning light (521) of the drone body.

On the other hand, in a case where the rotation speed of the motor still does not reach the predetermined rotation speed even after the target rotation speed is lowered, it is determined that the degeneration operation is not preferable, and the flight controller (501) may stop all the motors to urgently stop the drone (100) and allow the drone (100) to fall to the ground surface. For example, a case where a rope-shaped object is entangled is applied to this. In this case, it is desirable to stop all motors at the same time to avoid the runaway of the drone (100). At this time, as in the above-described case of contact with an obstacle, it is desirable to display a message on the remote controller (401), generate a warning sound from the buzzer (518), and turn on or blink the warning light (521) of the drone body.

Moreover, the process of detecting the decrease in the rotation speed of the motor and reducing the target rotation speed may be repeated twice or more, and the drone (100) may be stopped urgently only in a case where the degeneration operation is still impossible.

Figure 7:
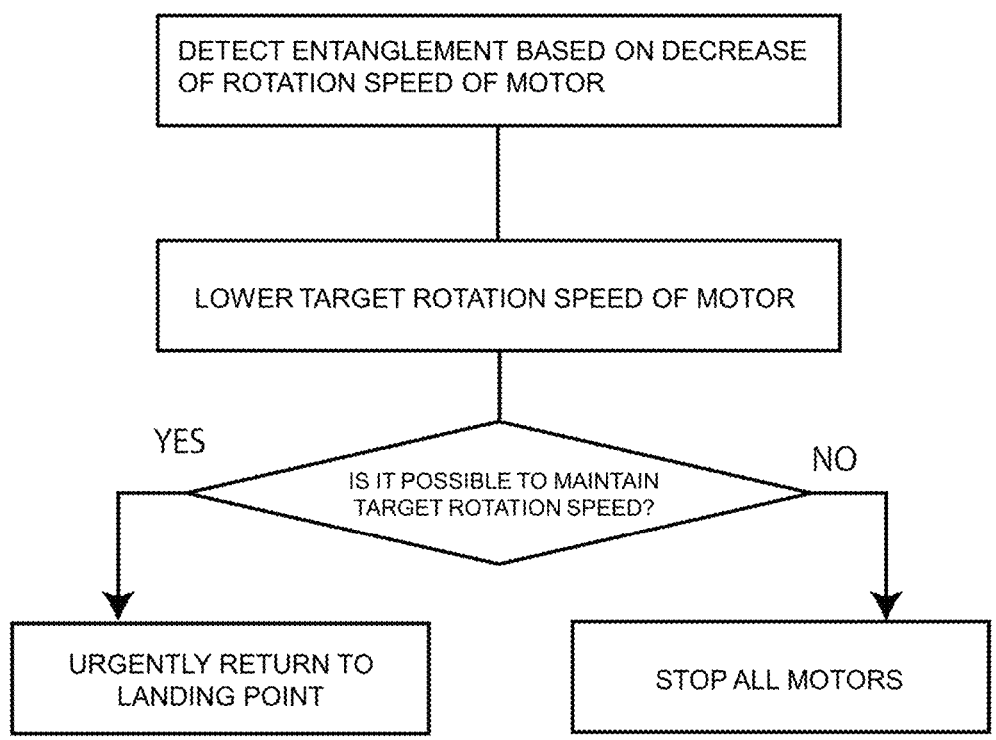
FIG. 7 is a flowchart illustrating a process at the time of entanglement detection in the embodiment of the drone according to the present invention.

In detecting the entanglement, in order to avoid erroneous detection, it may be determined that the entanglement occurs only in a case where the decrease in the rotation speed of the motor continues for a predetermined time or more. In this case, in a case where it is clear from an altitude sensor (for example, the GPS (504)) that the drone is on the ground, it is desirable to immediately determine the occurrence of the entanglement without waiting for a predetermined time and to perform control to immediately stop the motor. This is because there is a high possibility of finger insertion accidents. An example of the above-described process at the time of entanglement detection is summarized in the flowchart of FIG. 7.

Propeller Guard

Figure 8:
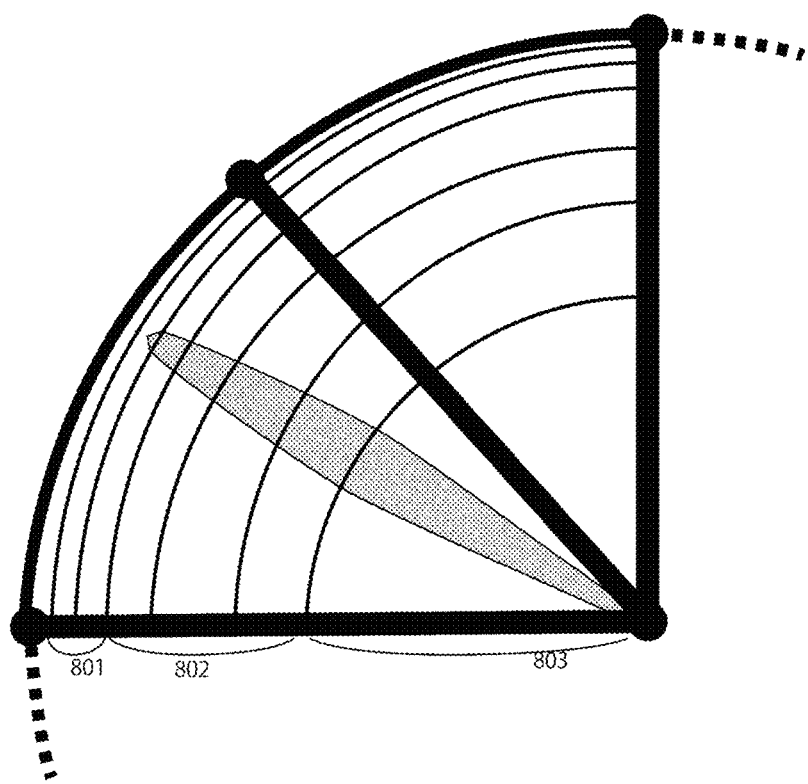
FIG. 8 is a schematic view illustrating an example of a structure of a propeller guard of the drone according to the present invention.

FIG. 8 illustrates a schematic view of a structure of an embodiment of the propeller guard part of the drone according to the present invention. FIG. 8 is a schematic view, and the scale is not necessarily accurate. Further, only a quarter of a circle is shown due to space reasons. Incidentally, the structure of FIG. 8 is not reflected in FIGS. 1, 2, and 3. It is desirable that the propeller guard is provided with a lattice-shaped member to prevent finger insertion accidents, and it is desirable that the propeller guard is designed to be divided into three areas of an outer peripheral part (801), a central part (802), and an inner peripheral part (803) (one piece as a mechanical structure but different design for each area). This is because the propeller guard needs to be configured by as few members as possible while maintaining safety in view of increased weight and increased air resistance to the airflow of the rotor blades. Since the outer peripheral part (801) has the highest linear speed of the rotor (propeller), and the peripheral part of the propeller guard is often held by hand at the time of transporting the airframe, particularly, since the outer peripheral part has a high risk of finger insertion accidents, it is desirable to have a lattice structure having a gap (for example, 15 mm or less) which does not allow a finger to enter. On the other hand, in the central part (802) closer to the center of the rotor, the linear speed of the rotor is relatively low, but it is desirable that the head of the infant is not caught therein when falling. Thus, it is desirable that the lattice structure has a gap of about 15 cm. The inner peripheral part (803) need not have a lattice structure guard as long as the inner peripheral part can comply with the restriction of the rotor linear speed required by various safety standards. For example, in a case where the entire radius of the propeller guard is 36 cm, the outer peripheral part (801) may have a width of about 5 cm, the central part (802) may have a width of about 10 cm, and the inner peripheral part (803) may have a width of about 21 cm.

Figure 9:
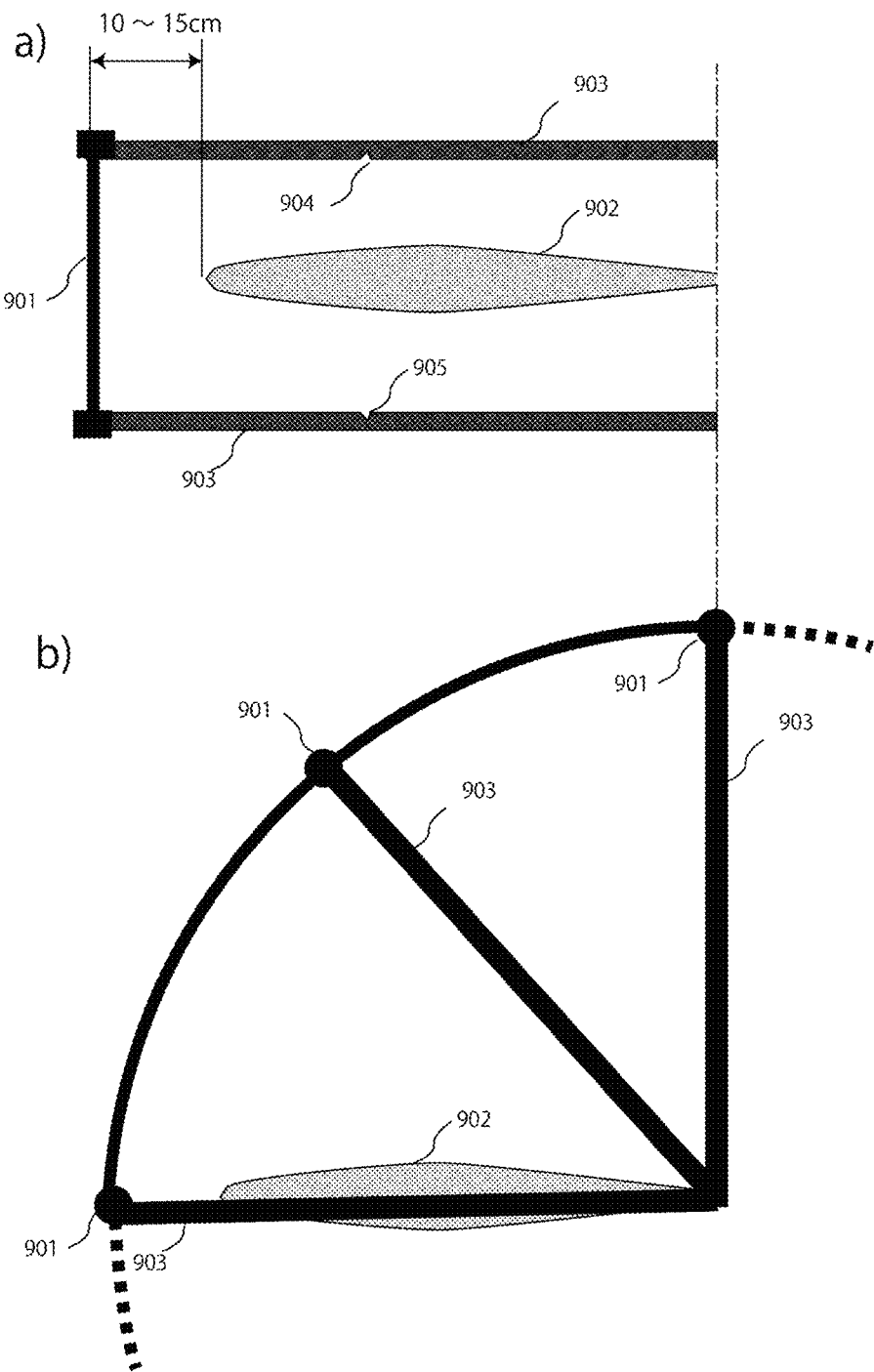
FIG. 9 is a schematic view illustrating a first embodiment of a structure of a support part of the propeller guard of the drone according to the present invention.

FIG. 9 illustrates a schematic view of a cross section and an upper surface of a first embodiment of a support part for connecting the propeller guard of the drone according to the present invention to the airframe body (FIG. 9-*a*) is a cross-sectional view, and FIG. 9-*b*) is a top view). FIG. 9 is a schematic view, and the scale is not accurate. Further, only a quarter of a circle is shown due to space reasons. Incidentally, incidentally, the structure of FIG. 9 is not reflected in FIGS. 1, 2, 3, and 8. It is desirable that the propeller guard has a structure which prevents the intrusion into the rotation space of the rotor even in a case where buckling deformation or breakage occurs at the time of collision. It is desirable that a propeller guard outer peripheral part (901) has a structure in which a sufficient gap (for example, 10 cm to 15 cm) is provided from the tip of a rotor (902). Further, it is desirable that a propeller guard radiation part (903) is provided with a notch (904) such that buckling deformation in the case of collision occurs on the outside of the rotor blade. Instead of or in addition to the notch (904), for example, by integrating a member such as a rib for reinforcing only the inside or by using a structure in which the radius of the radiation part member is made thicker on the inside, the buckling to the outside may be promoted.

Figure 10:
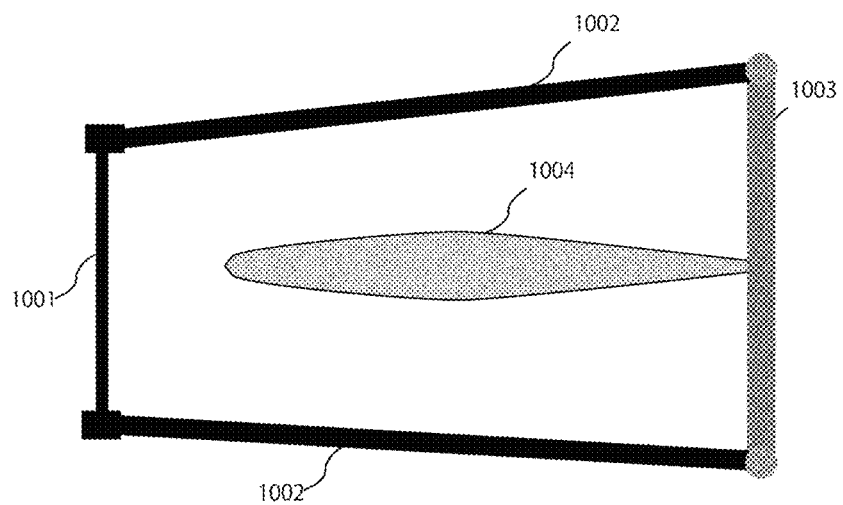
FIG. 10 is a schematic view illustrating a second embodiment of the structure of the support part of the propeller guard of the drone according to the present invention.

FIG. 10 illustrates a cross section of a second embodiment of the support part for connecting the propeller guard of the drone according to the present invention to the airframe body. Incidentally, the propeller guard structure of FIG. 10 is reflected in FIGS. 1, 2, and 3. In this embodiment, it is desirable that a radial support part (1002) connecting a propeller guard peripheral part (1001) to an airframe body (1003) (typically, a member provided at a position coinciding with the center axis of a rotor blade (1004)) is not horizontal but configured in a roof shape. That is, it is desirable that, in a case where the drone (100) is placed horizontally, the end of the support part (1002) on the upper surface of the rotor blade is provided at a high position in the center part and at a lower position in the peripheral part, and the end of the support part (1002) on the lower surface of the rotor blade is provided at a low position in the central part and at a high position in the peripheral part. By adopting such a structure, the buckling deformation of the support part (1002) on the outside of the rotor blade (1004) at the time of collision of the drone can be promoted to avoid the interference with the rotor blade (1004). The support part (1002) of the structure of FIG. 10 may be further provided with the notch portion illustrated in FIG. 9 or the above-described structure which promotes the buckling to the outside.

Hereinbefore, the embodiments of the drone for the purpose of chemical spraying are described. However, the present invention is also applied widely to agricultural drones which do not carry out chemical spraying and monitor growth with a camera, and general drones, for example.

Technically Remarkable Effect of Present Invention

According to the present invention, it becomes possible to effectively deal with the following dangerous events which pose a safety problem particularly in a drone which performs autonomous flight. First, an appropriate retreat action can be taken in the case of unexpected contact with a bird, a standing tree, an electric wire, a building, or the like. Secondly, an appropriate retreat action can be taken in a case where a rope, a plastic bag, a tree branch, or the like is entangled in the rotor blade. Thirdly, it is possible to prevent finger insertion accidents into the rotor blades. Fourthly, since the propeller girt and the rotor blades do not interfere with each other even in the event of a crash or collision, secondary damage and excessive damage to the device can be avoided.

The invention claimed is:

1. A drone, comprising: an acceleration measurement unit; a flight control unit; and a speed measurement unit;
   wherein the flight control unit causes an airframe to take a predetermined retreat action when:
   the acceleration measurement unit detects an increase or a change, more than or equal to a predetermined value, in an acceleration of the airframe within a predetermined time interval; and
   the speed measurement unit detects that a speed of the airframe becomes less than or equal to a predetermined value, and
   wherein the predetermined retreat action includes at least one of hovering or reversing a traveling direction.

2. The drone according to claim 1, further comprising a contact detection unit;
   wherein the flight control unit causes the airframe to take the predetermined retreat action when the contact detection unit detects contact of the airframe with an obstacle for more than or equal to a second predetermined time although an absolute value of the acceleration of the airframe measured by the acceleration measurement unit does not exceed the predetermined value, and
   wherein the predetermined retreat action includes stopping chemical spraying.

3. The drone according to claim 1, wherein the predetermined retreat action is hovering.

4. The drone according to claim 1, wherein the predetermined retreat action also includes any one of a warning sound, a warning light warning, and displaying on a remote controller.

5. The drone according to claim 1, further comprising a contact detection unit;
   wherein the flight control unit causes the airframe to take the predetermined retreat action when:
   an absolute value of the acceleration of the airframe measured by the acceleration measurement unit exceeds the predetermined value; and the contact detection unit detects contact of the airframe with an obstacle for more than or equal to a first predetermined time, wherein the predetermined retreat action is hovering, and the flight control unit causes the airframe to reverse the traveling direction when the contact detection unit detects contact of the airframe with the obstacle for more than or equal to a third predetermined time after the hovering.

6. The drone according to claim 1, further comprising a contact detection unit, wherein the flight control unit causes the airframe to take the predetermined retreat action when the contact detection unit detects contact of the airframe with an obstacle for more than or equal to a second predetermined time although an absolute value of the acceleration of the airframe measured by the acceleration measurement unit does not exceed the predetermined value, wherein the predetermined retreat action is hovering, and wherein the flight control unit causes the airframe to reverse the traveling direction when the contact detection unit detects contact of the airframe with the obstacle for more than or equal to a third predetermined time after the hovering.

7. A drone control method, comprising:

an acceleration measurement step of measuring an acceleration of an airframe;

a speed measurement step; and a retreat action step of causing the airframe to take a predetermined retreat action when:

an increase or a change, more than or equal to a predetermined value, is detected in the acceleration of the airframe within a predetermined time interval in the acceleration measurement step; and a speed of the airframe is detected to become less than or equal to a predetermined value in the speed measurement step, and wherein the predetermined retreat action includes at least one of hovering or reversing a traveling direction.

8. The drone control method, according to claim 7, further comprising:

a contact detection step of detecting contact of the airframe with an obstacle, wherein the retreat action step causes the airframe to take the predetermined retreat action when an absolute value of the measured acceleration of the airframe exceeds the predetermined value and the contact of the airframe with the obstacle is detected for more than or equal to a first predetermined time, wherein the predetermined retreat action is hovering, and wherein the retreat action step causes the airframe to reverse the traveling direction when contact of the airframe with the obstacle for more than or equal to a third predetermined time is detected after the hovering.

9. The drone control method, according to claim 7, further comprising:

a contact detection step of detecting contact of the airframe with an obstacle, wherein the retreat action step causes the airframe to take the predetermined retreat action when the contact of the airframe with the obstacle is detected for more than or equal to a second predetermined time although an absolute value of the measured acceleration of the airframe does not exceed the predetermined value, wherein the predetermined retreat action is hovering, and wherein the retreat action step causes the airframe to reverse the in a traveling direction when contact of the airframe with the obstacle for more than or equal to a third predetermined time is detected after the hovering.

10. A non-transitory computer-readable storage medium that stores a computer-executable program for controlling a drone, the program comprising instructions for:

measuring an acceleration of an airframe;

measuring a speed; and causing the airframe to take a predetermined retreat action when:

an increase or a change, more than or equal to a predetermined value, is detected in the acceleration of the airframe within a predetermined time interval; and a speed of the airframe is detected to become less than or equal to a predetermined value, wherein the predetermined retreat action includes at least one of hovering or reversing a traveling direction.

11. The non-transitory computer-readable storage medium according to claim 10, the program further comprising instructions for:

detecting contact of the airframe with an obstacle;

causing the airframe to take the predetermined retreat action of hovering when an absolute value of the measured acceleration of the airframe exceeds the predetermined value and the contact of the airframe with the obstacle is detected for more than or equal to a first predetermined time; and causing the airframe to reverse the traveling direction when contact of the airframe with the obstacle for more than or equal to a third predetermined time is detected after the hovering.

12. The non-transitory computer-readable storage medium according to claim 10, the program further comprising instructions for:

detecting contact of the airframe with an obstacle;

causing the airframe to take the predetermined retreat action of hovering when the contact of the airframe with the obstacle is detected for more than or equal to a second predetermined time although an absolute value of the measured acceleration of the airframe does not exceed the predetermined value; and causing the airframe to reverse the traveling direction when contact of the airframe with the obstacle for more than or equal to a third predetermined time is detected after the hovering.

\* \* \* \* \*